(12) United States Patent
Nichols

(10) Patent No.: US 8,302,623 B1
(45) Date of Patent: Nov. 6, 2012

(54) ANTI-BACKFLOW INSERT FOR A FIRE HYDRANT OUTLET

(76) Inventor: H. Brunson Nichols, Gantt, AL (US)

( * ) Notice: Subject to any disclaimer, the term of this patent is extended or adjusted under 35 U.S.C. 154(b) by 95 days.

(21) Appl. No.: 13/013,178

(22) Filed: Jan. 25, 2011

(51) Int. Cl.
F16K 15/03 (2006.01)
(52) U.S. Cl. ............... 137/527.8; 137/283; 137/299
(58) Field of Classification Search ....... 137/527–527.8, 137/283, 299
See application file for complete search history.

(56) References Cited

U.S. PATENT DOCUMENTS

| | | | |
|---|---|---|---|
| 1,000,719 A * | 8/1911 | Cram | 210/117 |
| 1,348,562 A * | 8/1920 | Hauser | 137/527.8 |
| 2,781,054 A * | 2/1957 | Neumann | 137/527.8 |
| 3,914,966 A | 10/1975 | Bello | |
| 4,039,004 A * | 8/1977 | Luthy | 137/527 |
| 4,266,569 A * | 5/1981 | Wilson | 137/527.8 |
| 4,620,428 A | 11/1986 | Kopesky | |
| 5,033,501 A | 7/1991 | Stehling | |
| 5,596,893 A | 1/1997 | Stehling et al. | |
| 5,803,513 A | 9/1998 | Richardson | |
| 5,813,428 A | 9/1998 | Almasy et al. | |
| 6,910,495 B2 | 6/2005 | Lafalce | |
| 6,994,106 B1 | 2/2006 | Hackley et al. | |
| 7,040,342 B1 | 5/2006 | Stehling et al. | |
| 7,128,091 B2 | 10/2006 | Istre, Jr. | |
| 7,174,911 B2 | 2/2007 | Davidson | |
| 7,240,688 B2 | 7/2007 | Davidson, Sr. et al. | |
| 7,575,017 B2 | 8/2009 | Davidson, Sr. et al. | |
| 7,686,031 B2 | 3/2010 | German et al. | |
| 7,775,231 B2 | 8/2010 | Davidson, Sr. et al. | |
| 2010/0132807 A1 | 6/2010 | Vasconi | |
| 2010/0276009 A1 | 11/2010 | Wilber et al. | |

* cited by examiner

Primary Examiner — Kevin Lee
Assistant Examiner — Macade Brown
(74) Attorney, Agent, or Firm — Gerald M. Walsh; Kenneth M. Bush; Bush Intellectual Property Law

(57) ABSTRACT

An cylindrical hollow anti-backflow insert that can rapidly retrofit a fire hydrant to prevent a forced liquid inflow into the fire hydrant after simple insertion of the insert into the outflow nozzles of a fire hydrant. A curved anti-backflow flap having a hinge at one end and an inflow fin at an opposite end is positioned within the insert. Outflow of water from the fire hydrant will cause the flap to rotate upwards, at which point the inflow fin protrudes into the interior of the insert sufficiently to catch any forced liquid inflow stream which will force the flap downward towards a curved flap seal. The curved flap seal reversibly engages the perimeter of the flap, thereby reversibly closing the rear end of the insert and preventing the forced inflow of liquid into the fire hydrant.

19 Claims, 7 Drawing Sheets

SECTION B-B

SECTION C-C

ANTI-BACKFLOW INSERT FOR A FIRE HYDRANT OUTLET

FIELD OF THE INVENTION

The present invention relates to fire hydrant security and, more particularly, to a backflow prevention insert for retrofitting a fire hydrant outlet to prevent contamination of a municipal water supply.

BACKGROUND OF THE INVENTION

Fire hydrants are in fluid communication with water lines, or a municipal water supply, and they have enough water pressure for the water to rise through the fire hydrant body and spray outwardly when a valve of the fire hydrant is open. Fire hydrants are typically located in public areas making them easy to locate, and easy to access. Unfortunately, the fire hydrant can be opened by an unauthorized person in an attempt to contaminate a public water supply by introducing toxins or other dangerous materials into the fire hydrant outlet, and, thus, into the water supply. A simple flat anti-backflow disc or flap is disclosed in U.S. Pat. No. 7,686,031 which prevents fluid from being pumped into the fire hydrant in an attempt to introduce substances into the water supply. However, the anti-backflow flap is positioned at the base of a fire hydrant tower and inside the fire hydrant tower, and is not practical or useful for retrofitting a fire hydrant outlet extending from the fire hydrant tower. In addition, because the anti-backflow flap is flat it unduly restricts the outflow of water. U.S. Pat. No. 7,240,688 discloses retrofitting a fire hydrant with a secondary valve. However, the secondary valve must be placed in the fire hydrant tower and is not suitable for retrofitting a fire hydrant outlet. U.S. Pat. No. 6,910,495 discloses a backflow prevention system which is positioned inside the outlet of a fire hydrant. This device is not suitable for retrofitting an outlet of a fire hydrant and it unduly restricts the outflow of water. What is needed, but which heretofore has not been available, is a simple backflow prevention insert for retrofitting a fire hydrant outlet which does not restrict outflow.

SUMMARY OF THE INVENTION

The present invention is an anti-backflow device for retrofitting an outflow nozzle of a fire hydrant. The device is a hollow cylindrical anti-back flow insert defining an interior. The insert has an external surface, an interior surface, a front end, a rear end, a top portion, and a bottom portion. A curved anti-backflow flap having a hinge at one end and an inflow fin at an opposite end is positioned within the interior of the insert. The flap has a hinge to attach the flap rotatably within the insert to the interior surface and top portion of the insert, near the rear end of the insert, so that outflow of water from the fire hydrant will cause the flap to rotate towards the front end and top portion of the insert. The flap is curved to conform to the curvature of the internal circumference of the insert at the top portion of the insert. There is a curved flap seal on the interior surface of the insert near the rear end of the insert. The curved flap seal is formed around an internal circumference of the insert. When the flap is rotated upwards to the top portion of the insert the inflow fin protrudes into the interior of the insert sufficiently to catch an inflow stream of liquid so as to force the flap downward against the curved flap seal. When the curved flap seal reversibly engages the perimeter of the flap, the rear end of the insert is reversibly closed. The insert also has an anti-tamper protrusion on the interior surface of the insert to prevent the insertion of a tool or device into the insert and under the flap to force the flap into a fixed open position. The external surface of the insert may have one or more seals and/or one or more locking rings, wherein the locking rings prevent removal of the insert from the outflow nozzle. Set screws may be provided on the interior of the insert to further prevent removal of the insert from the outflow nozzle. The top portion of the insert has a hinge receptacle for attaching the hinge of the flap. The hinge may have a spring to bias the flap towards the curved flap seal.

An advantage of the present invention is an inexpensive cylindrical anti-backflow insert that can rapidly retrofit a fire hydrant to prevent fluid inflow into the fire hydrant by simple insertion of the insert into the outflow nozzles of a fire hydrant.

Another advantage is the use of a curved anti-backflow flap in the insert which does not obstruct the normal outflow of water from the outflow nozzle.

Another advantage is a curved flap seal on the interior wall of the insert that engages the anti-backflow flap to seal and close the rear of the insert, thereby preventing inflow or backflow of fluid into the fire hydrant.

Another advantage is an inflow fin on the anti-backflow flap which insures that an inflow of fluid will force the anti-backflow flap to close against the curved flap seal.

Another advantage is an anti-tamper protrusion within the insert which prevents a person from prying open the anti-backflow flap from its seated position on the curved flap seal.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
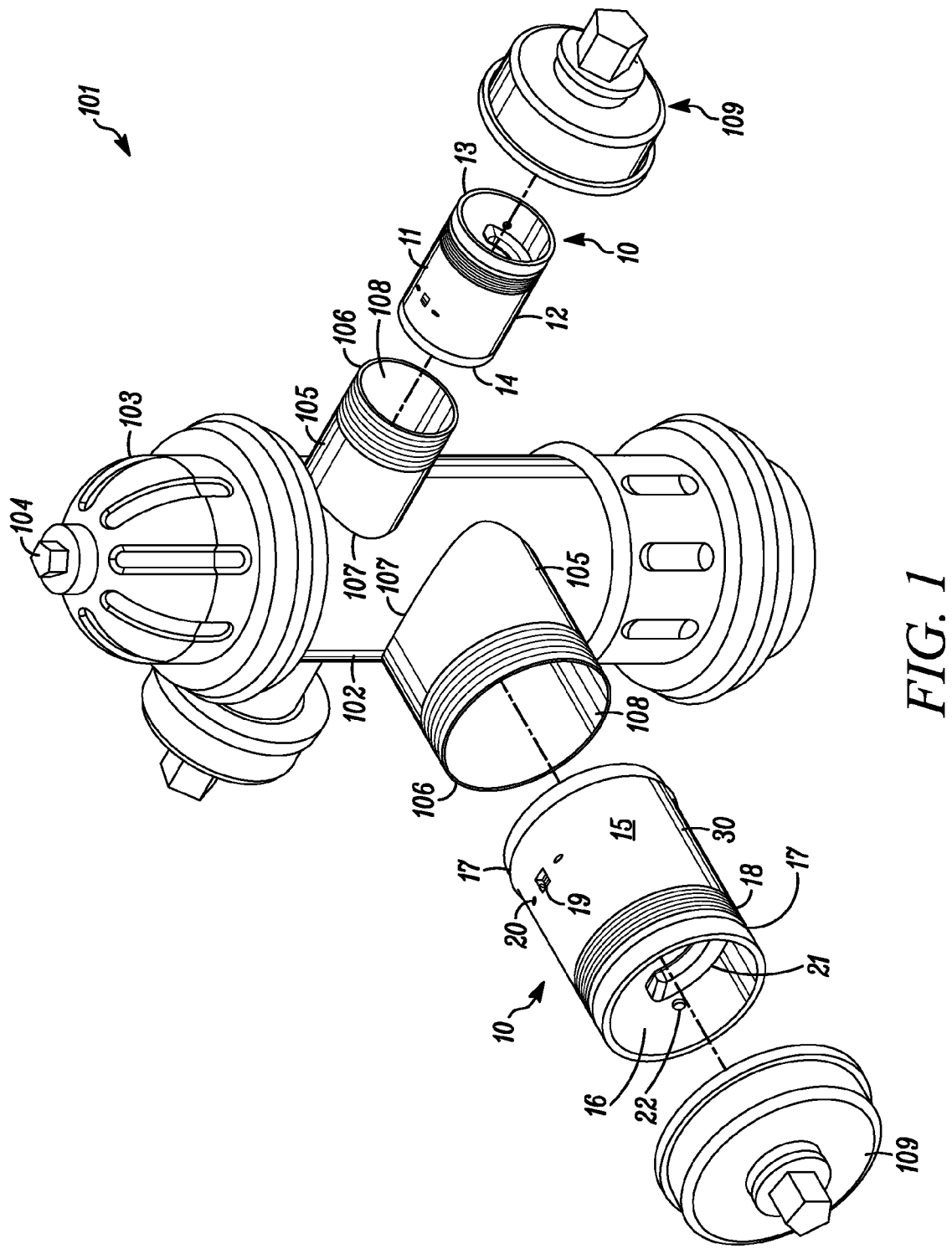
FIG. 1 shows exploded views of the anti-backflow insert of the present invention, and the outflow nozzle and outflow nozzle cap of a fire hydrant.

FIG. 1 shows exploded views of the anti-backflow inserts 10 of the present invention, and the outflow nozzle 105 and outflow nozzle cap 109 of a typical fire hydrant 101. Fire hydrant 101 has a vertical barrel 102 with a cap 103 on its upper end. On top of cap 103 is a valve nut 104 which is used to open an internal valve in the fire hydrant 101 to allow water to flow out through the outflow nozzle 105, and to shut off water flow. Outflow nozzle 105 has a front outlet 106 with opening 108, and a rear inlet 107. The opening 108 of outflow nozzle 105 is closed with an outflow nozzle cap 109. The anti-backflow insert 10 is constructed for insertion through outflow nozzle opening 108, forming a close tolerance fit within the outflow nozzle 105 and, preferably, extending along the entire length of the outflow nozzle 105. In addition, the anti-backflow insert 10 does not extend beyond opening 108 so that the outflow nozzle cap 109 can be used to close opening 108 when the anti-backflow insert 10 is positioned within the outflow nozzle 105.

Anti-backflow insert 10 is a hollow cylindrical structure 30, conforming to the shape of the outflow nozzle 105 of the fire hydrant 101. The insert 10 has a top portion 11, a bottom portion 12, a front end 13, a rear end 14, an external surface 15, and internal surface 16. There is a seal 17, such as a rubber seal, around the circumference of the external surface 15 near the front end 13 and the rear end 14. There is a locking ring 18, preferably with protrusions, around the circumference of the external surface 15 near the front end 13, and also near the rear end 14 if desired. There is a hinge receptacle 19 positioned on the top portion 11 of the insert 10, with hinge pin openings 20 on either side of receptacle 19. There is an anti-tamper protrusion 21 on the internal surface 16 on the bottom portion 12 of the insert, near front end 13. There are also openings 22 for set screws.

Figure 2:
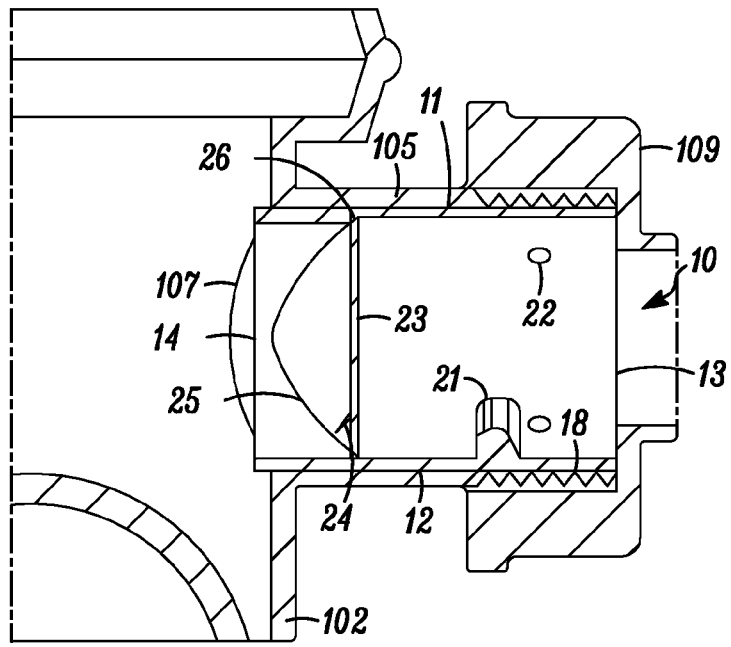
FIG. 2 shows a sectional side view of the anti-backflow insert inserted in the outflow nozzle.

FIG. 2 shows a sectional side view of the anti-backflow insert 10 inserted in the outflow nozzle 105. Further illustrated is the anti-backflow flap 23 of the present invention having an anti-inflow (or anti-backflow) fin 24 positioned at the bottom portion of flap 23, and a hinge 26 at the top portion of flap 23. Flap 23 is curved and it engages a curved seal 25 on the interior surface 16 near the rear 14 of insert 10 when flap 23 is in the closed position.

Figure 3:
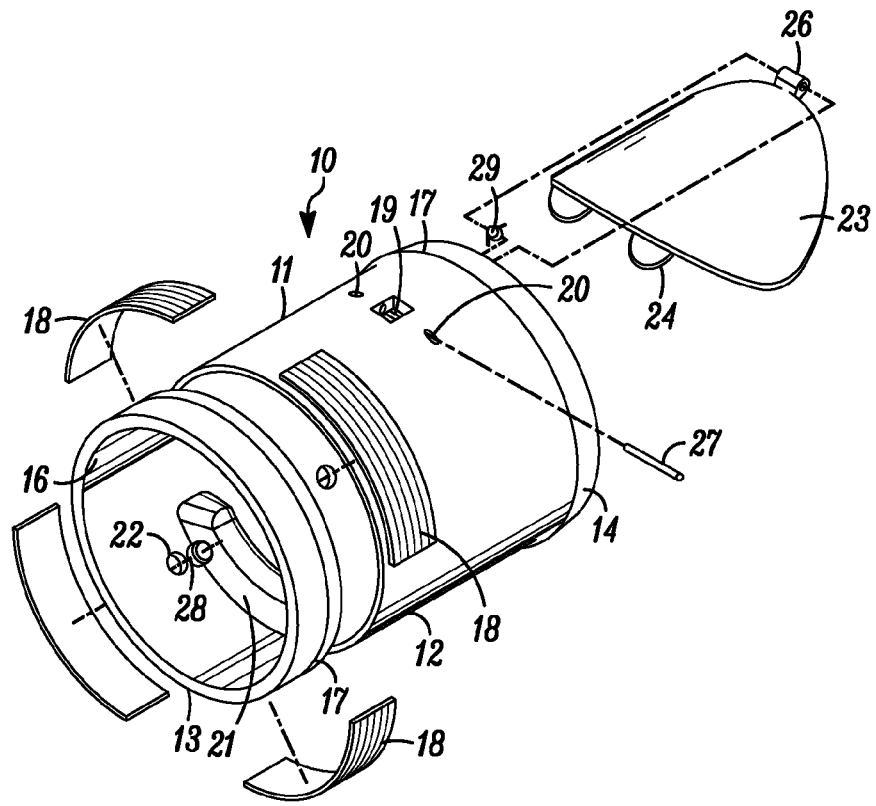
FIG. 3 shows a top, front, perspective, exploded view of the anti-backflow insert.
Figure 4:
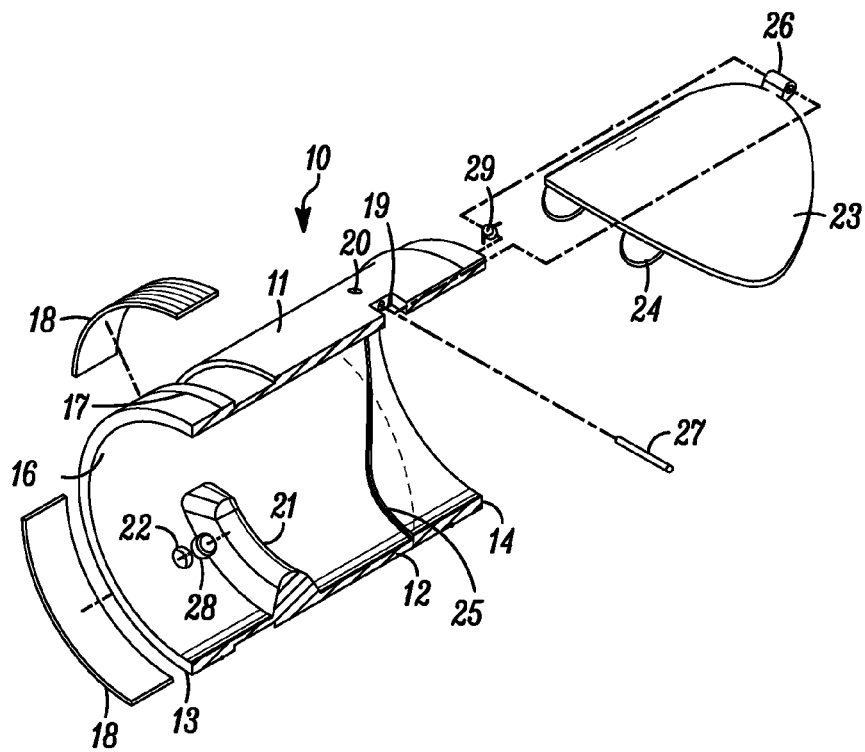
FIG. 4 shows a top, front, perspective, exploded, cut-away view of the anti-backflow insert.
Figure 5:
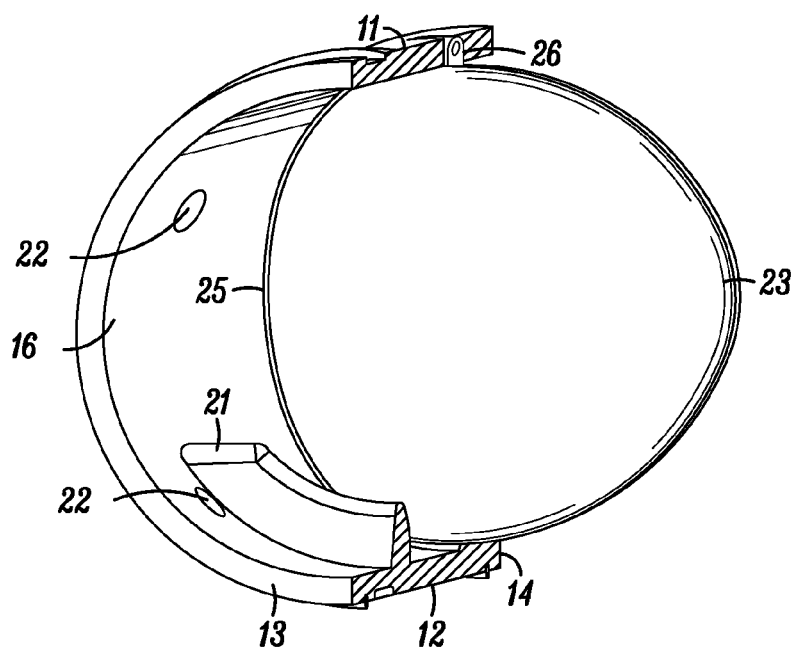
FIG. 5 shows a cut-away view of the anti-backflow insert with the anti-backflow flap of the present invention mounted inside the insert and in the closed position.

FIG. 3 shows a top, front, perspective, exploded view of the anti-backflow insert 10, further illustrating hinge pin 27, set screw 28, and hinge spring 29. FIG. 4 shows a top, front, perspective, exploded, cut-away view of the anti-backflow insert 10. FIG. 5 shows a cut-away view of the anti-backflow insert 10 with the anti-backflow flap 23 of the present invention mounted inside the insert 10 and in the closed position, resting against the flap seal 25. The flap 23 is hinged within insert 10 by placing the hinge 26 into the hinge receptacle 19, and then inserting the hinge pin 27 through a first hinge pin opening 20 in the top portion 11 of the insert 10, then through the hinge 26, and then through a second opposite hinge pin opening 20.

Figure 6:
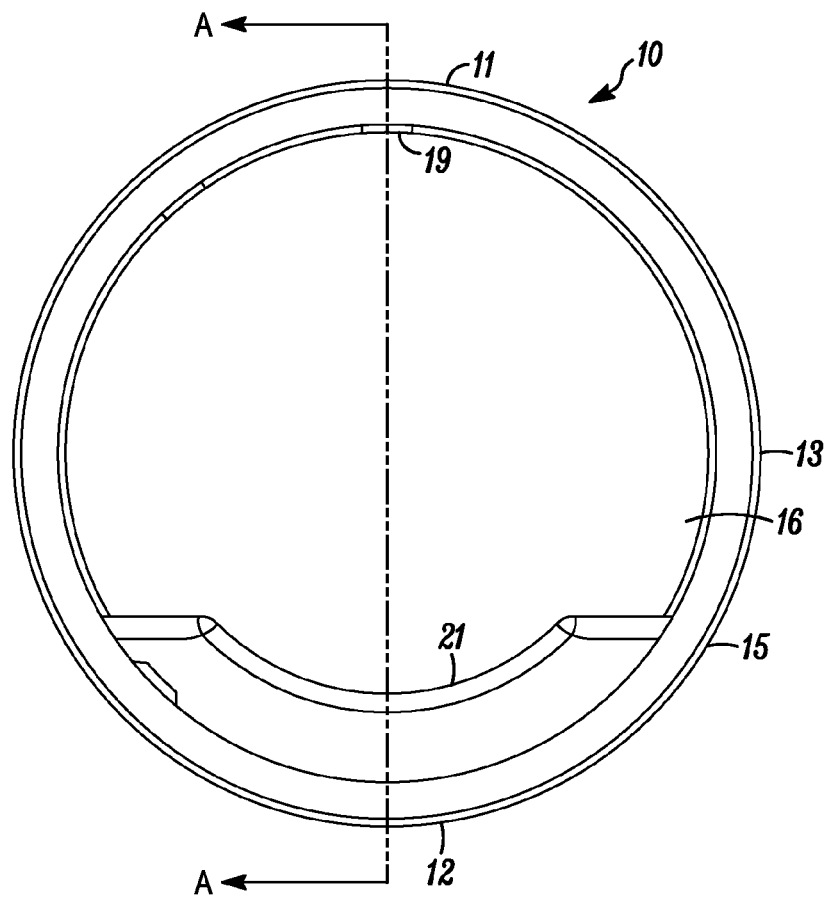
FIG. 6 shows a front view of the anti-backflow insert in the closed position.
Figure 7:
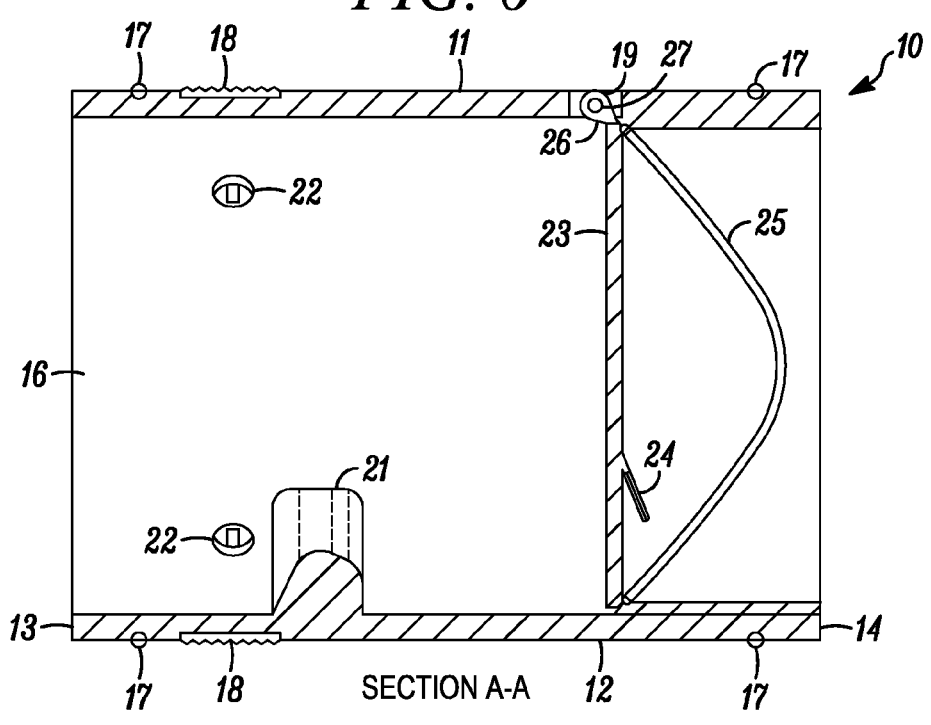
FIG. 7 shows a sectional side view of the anti-backflow insert in the closed position.

FIG. 6 shows a front view of the anti-backflow insert 10 in the closed position. FIG. 7 shows a sectional side view through line A-A of FIG. 6. The concave face of flap 23 faces towards the front end 13 of insert 10, and the convex face faces towards rear end 14.

Figure 8:
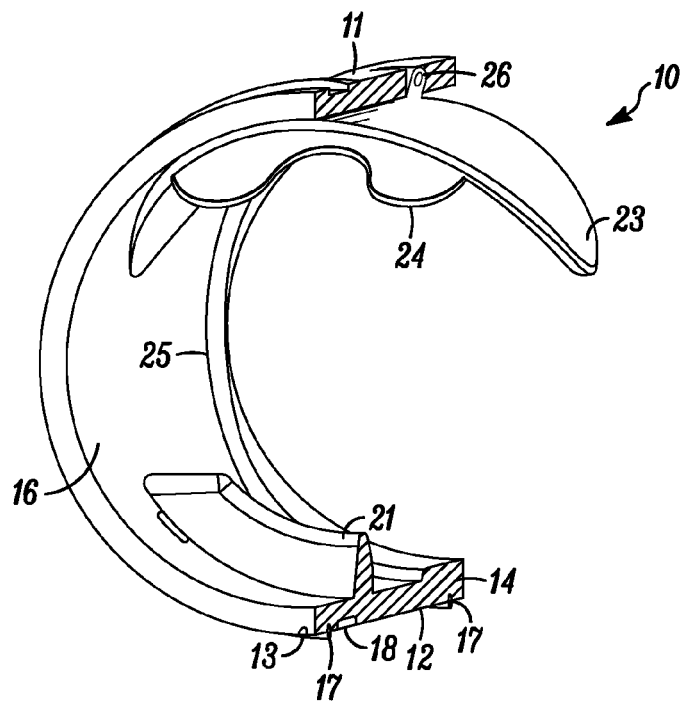
FIG. 8 shows a cut-away view of the anti-backflow insert in the open position.
Figure 9:
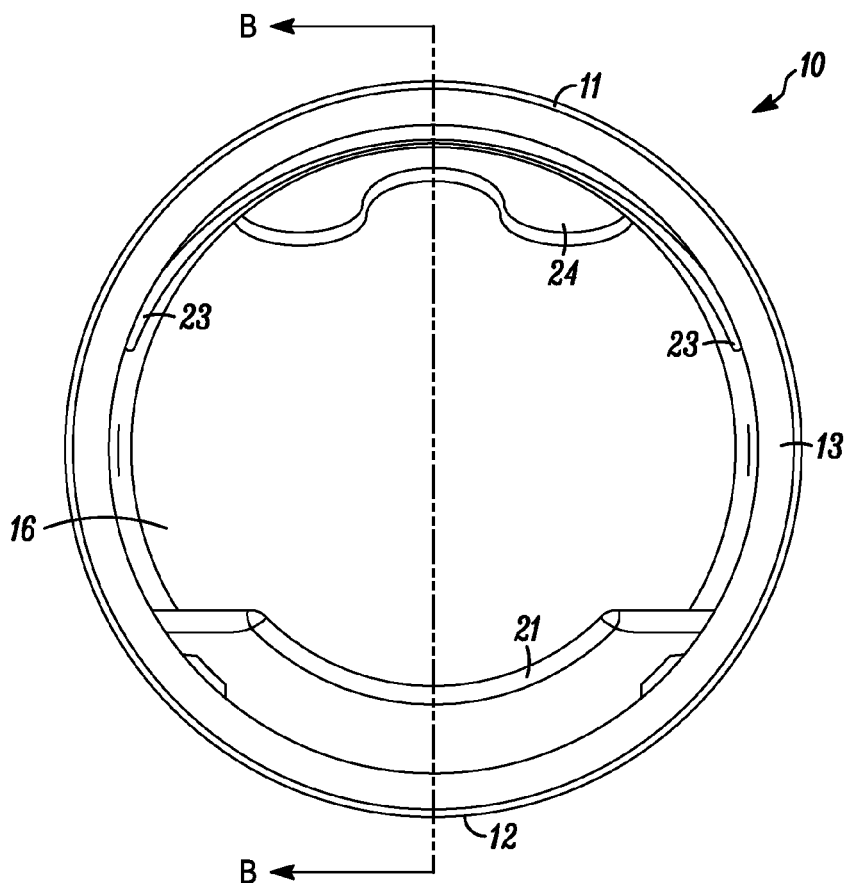
FIG. 9 shows a front view of the anti-backflow insert in the open position.
Figure 10:
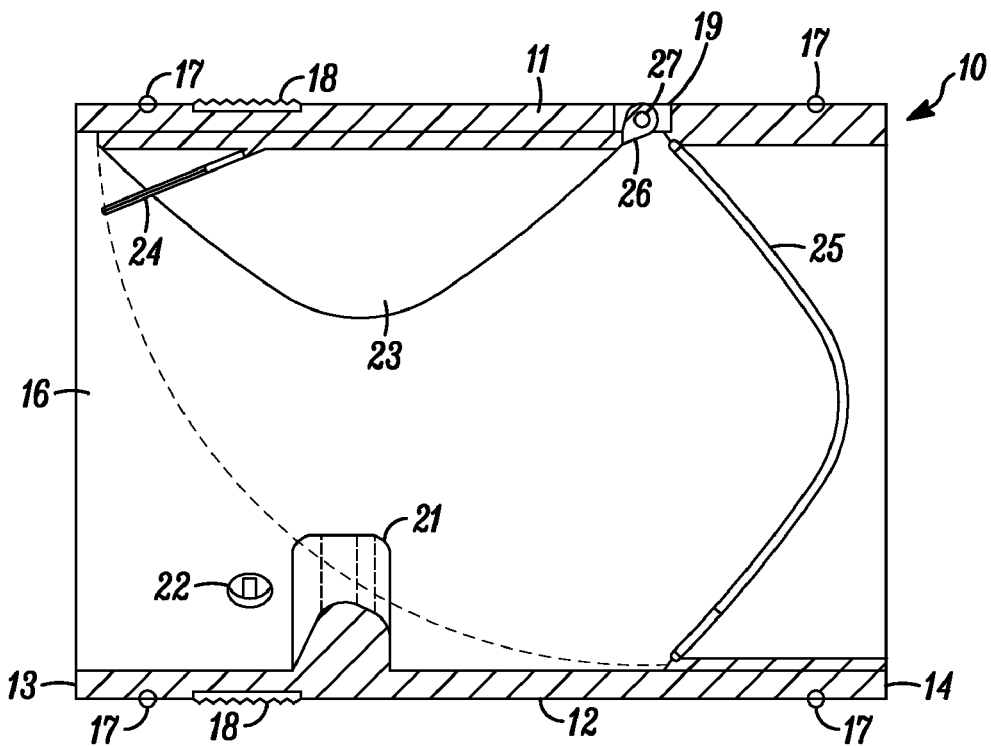
FIG. 10 shows a sectional side view of the anti-backflow insert in the open position.

FIG. 8 shows a cut-away view of the anti-backflow insert 10 in the open position. Flap 23 is curved to conform to the curved interior surface 16 when the flap 23 is rotated upwards to the top portion 11 of the insert 10. FIG. 9 shows a front view of the anti-backflow insert 10 in the open position. FIG. 10 shows a sectional side view through line B-B of FIG. 9.

Figure 11:
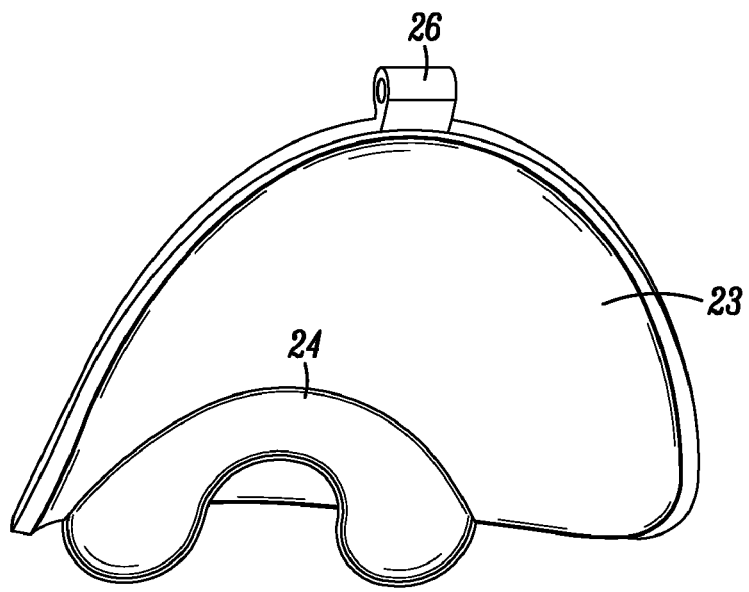
FIG. 11 shows a rear perspective view of the anti-backflow flap.
Figure 12:
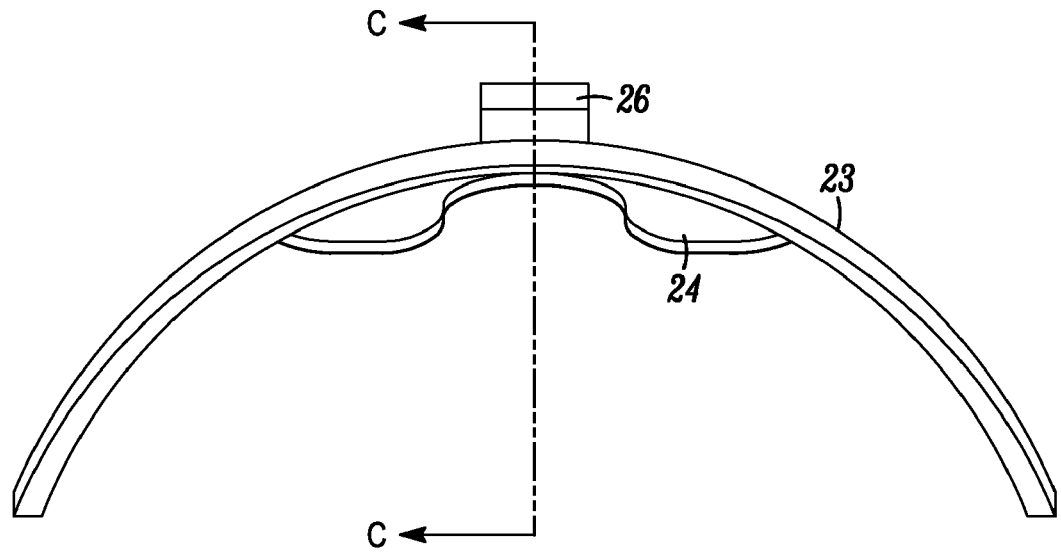
FIG. 12 shows a front view of the anti-backflow flap.
Figure 13:
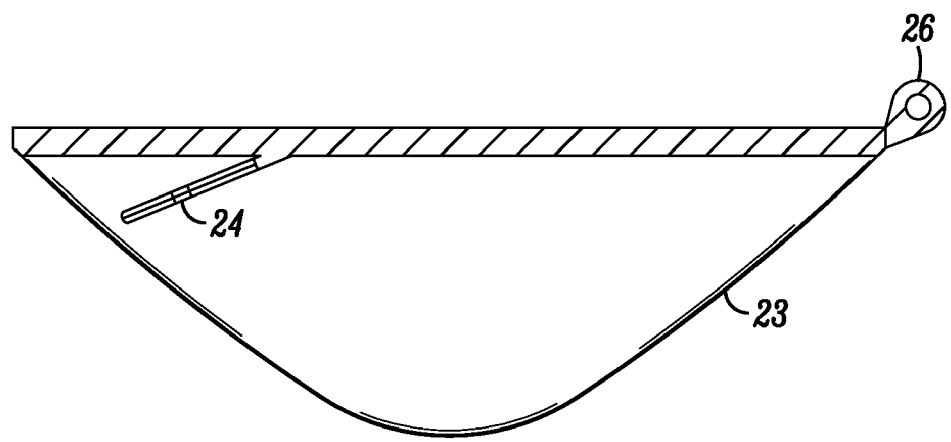
FIG. 13 shows a sectional side view of the anti-backflow flap.

FIG. 11 shows a rear perspective view of the anti-backflow flap 23. FIG. 12 shows a front view of the anti-backflow flap 23. FIG. 13 shows a sectional side view of the anti-backflow flap 10 through line C-C in FIG. 12. Flap 23 is curved to conform to the curvature of the internal circumference of the insert 23 at the top portion 11. When flap 23 is rotated upwards to the top portion 11 of the insert 10, the inflow fin 24 protrudes slightly into the interior of insert 10, sufficiently to catch any inflow stream of liquid so as to force the flap 23 downward against seal 25, thereby closing the insert 10. This prevents any fluid from being forced backwards into the fire hydrant 101 through the outflow nozzle 105.

The anti-backflow insert 10 of the present invention is designed to retrofit an existing fire hydrant 101 to prevent a person from pumping fluid backward (inward) into the fire hydrant 101 in order, for example, to contaminate a municipal water supply. The insert 10 may first be assembled by inserting the anti-backflow flap 23 into the interior of the insert 10 so that the concave face of the flap 23 faces towards the front end 13 of the insert 10, and the convex face faces towards the rear end 14. The hinge 26 is inserted into the hinge receptacle 19, between the two hinge pin openings 20. A hinge pin 27 is inserted through the hinge pin openings 20 and the hinge 26 so that the hinge 26 rotates from the top portion 11 of the insert 10. The hinge 26 may have a spring 29 to bias the flap 23 downward in a closed position against the internal flap seal 25. The insert 10 is then pushed into the interior of the outflow nozzle 105 until the front end 13 is flush with the opening 108 of the front orifice 106 of the nozzle 105. The locking ring 18 may have protrusions oriented so that the insert 10 can be pushed into the nozzle 105 but will resist removal of the insert 10 from the nozzle 105. The insert is further locked into place by threading the set screws 28 into the set screw holes 22 and tightening them against the interior surface of the nozzle 105.

When a fire hydrant is turned on, water will flow out through the outflow nozzle 105. In doing so, it will push on the anti-backflow flap 23 causing it to rotate upward towards the top portion 11 of the insert 10. Because of the curved design of the flap 23, it conforms to the curved interior surface 16 of the insert 10 and, therefore, does not obstruct the outflow of water. When the water is turned off the flap 23 will rotate downwards by action of spring 29 and engage the curved seal 25 that is formed around the internal circumference of the insert 10, thereby closing the rear orifice 107 of the outflow nozzle 105.

A person may attempt to pump fluid back through an outflow nozzle 105 of a fire hydrant by attaching a hose to the nozzle 105, turning on a pump to pump the fluid, and then turning on the fire hydrant. If the pressure in the person's hose exceeds the water pressure of the fire hydrant, the fluid in the person's hose will not enter the fire hydrant because the flap 23 will be closed against its seal 25. If the pressure in the person's hose is less than the water pressure of the fire hydrant, the water will flow into the outflow nozzle 105, forcing the flap 23 to rotate upward and allowing the water to flow out of the outflow nozzle 105. If the person then increases the pressure in the hose to exceed the water pressure of the fire hydrant, the fluid will begin to flow into the outflow nozzle 105. However, inflow of fluid from the hose will force the flap 23 to rotate downward and close the insert 10. An inflow/backflow fin 24 may be attached to the flap 23 to facilitate this process. Inflow of fluid from the hose will contact the inflow/backflow fin 24 attached to the flap 23 and force the flap 24 downward. The inflow pressure from the hose will continue to force the flap 23 downward towards its seal 25 and keep the flap 23 against its seal 25, thereby closing the rear orifice 107 of the outflow nozzle and preventing backflow (inflow) into the fire hydrant. The anti-tamper protrusion 21 will prevent the person from inserting a tool or device under flap 23 and forcing flap 23 into a fixed open position.

The foregoing description has been limited to specific embodiments of this invention. It will be apparent, however, that variations and modifications may be made, by those skilled in the art, to the disclosed embodiments of the invention, with the attainment of some or all of its advantages and without departing from the spirit and scope of the present invention. For example, more than one locking ring can be used on the external surface of the insert. The locking rings can have any suitable locking fins or projections which allow the insert to be pushed into the outflow nozzle but prevent someone from pulling the insert out of the outflow nozzle. The anti-tamper protrusion can have any desired shape. The set screws can be mounted in any desired location. The insert can be made in any desired size from any suitable metal, plastic, or combination thereof.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. An anti-backflow device for an outflow nozzle of a fire hydrant, comprising:
   a) a hollow cylindrical insert defining an interior, said insert having an external surface, an interior surface, a front end, a rear end, a top portion, and a bottom portion;
   b) a curved anti-backflow flap having a hinge at one end and an inflow fin at an opposite end;
   c) said flap being hinged rotatably within the insert to the interior surface and top portion of the insert, near the rear end of the insert, so that outflow of water from the fire hydrant will cause the flap to rotate towards the front end and top portion of the insert;
   d) a curved flap seal on the interior surface of the insert near the rear end of the insert, said curved flap seal reversibly engaging a perimeter of the flap, thereby reversibly closing the rear end of the insert; and
   e) an anti-tamper protrusion on the interior surface of said insert to prevent the insertion of a tool or device into said insert and under said flap to force said flap into a fixed open position.

2. The anti-backflow device of claim 1 wherein said flap is curved to conform to the curvature of an internal circumference of said insert at the top portion of the insert.

3. The anti-backflow device of claim 1 wherein, when said flap is rotated upwards to the top portion of said insert, said inflow fin protrudes into the interior of said insert sufficiently to catch an inflow stream of liquid so as to force said flap downward towards said curved flap seal.

4. The anti-backflow device of claim 1 wherein said curved flap seal is formed around an internal circumference of said insert.

5. The anti-backflow device of claim 1, further comprising one or more seals and/or one or more locking rings on the external surface of said insert, wherein said locking rings prevent removal of said insert from said outflow nozzle.

6. The anti-backflow device of claim 1, further comprising set screws to prevent removal of said insert from said outflow nozzle.

7. The anti-backflow device of claim 1, further comprising a hinge receptacle on said top portion of said insert for attaching said hinge of said flap.

8. The anti-backflow device of claim 1 wherein said hinge has a spring to bias said flap towards said curved flap seal.

9. An anti-backflow device for an outflow nozzle of a fire hydrant, comprising:
   a) a hollow cylindrical insert defining an interior, said insert having an external surface, an interior surface, a front end, a rear end, a top portion, and a bottom portion;
   b) a curved anti-backflow flap having a hinge at one end and an inflow fin at an opposite end, wherein said flap is curved to conform to the curvature of an internal circumference of said insert at the top portion of the insert;
   c) said flap being hinged rotatably within the insert to the interior surface and top portion of the insert, near the rear end of the insert, so that outflow of water from the fire hydrant will cause the flap to rotate towards the front end and top portion of the insert;
   d) a curved flap seal on the interior surface of the insert near the rear end of the insert wherein, when said flap is rotated upwards to the top portion of said insert, said inflow fin protrudes into the interior of said insert sufficiently to catch an inflow stream of liquid so as to force said flap downward towards said curved flap seal, said curved flap seal reversibly engaging a perimeter of the flap, thereby reversibly closing the rear end of the insert; and
   e) an anti-tamper protrusion on the interior surface of said insert to prevent the insertion of a tool or device into said insert and under said flap to force said flap into a fixed open position.

10. The anti-backflow device of claim 9 wherein said curved flap seal is formed around an internal circumference of said insert.

11. The anti-backflow device of claim 9, further comprising one or more seals and/or one or more locking rings on the external surface of said insert, wherein said locking rings prevent removal of said insert from said outflow nozzle.

12. The anti-backflow device of claim 9, further comprising set screws to prevent removal of said insert from said outflow nozzle.

13. The anti-backflow device of claim 9, further comprising a hinge receptacle on said top portion of said insert for attaching said hinge of said flap.

14. The anti-backflow device of claim 9 wherein said hinge has a spring to bias said flap towards said curved flap seal.

15. An anti-backflow device for an outflow nozzle of a fire hydrant, comprising:
   a) a hollow cylindrical insert defining an interior, said insert having an external surface, an interior surface, a front end, a rear end, a top portion, and a bottom portion;
   b) a curved anti-backflow flap having a hinge at one end and an inflow fin at an opposite end, wherein said flap is curved to conform to the curvature of an internal circumference of said insert at the top portion of the insert;
   c) said flap being hinged rotatably within the insert to the interior surface and top portion of the insert, near the rear end of the insert, so that outflow of water from the fire hydrant will cause the flap to rotate towards the front end and top portion of the insert;
   d) a curved flap seal formed around an internal circumference of said insert near the rear end of said insert wherein, when said flap is rotated upwards to the top portion of said insert, said inflow fin protrudes into the interior of said insert sufficiently to catch an inflow stream of liquid so as to force said flap downward towards said curved flap seal, said curved flap seal reversibly engaging a perimeter of the flap, thereby reversibly closing the rear end of the insert; and e) an anti-tamper protrusion on the interior surface of said insert to prevent the insertion of a tool or device into said insert and under said flap to force said flap into a fixed open position.

16. The anti-backflow device of claim 15, further comprising one or more seals and/or one or more locking rings on the external surface of said insert, wherein said locking rings prevent removal of said insert from said outflow nozzle.

17. The anti-backflow device of claim 16, further comprising set screws to prevent removal of said insert from said outflow nozzle.

18. The anti-backflow device of claim 17, further comprising a hinge receptacle on said top portion of said insert for attaching said hinge of said flap.

19. The anti-backflow device of claim 18 wherein said hinge has a spring to bias said flap towards said curved flap seal.

* * * * *